May 12, 1953 W. A. CARROLL 2,638,221
FUEL FILTER AND DEMULSIFIER
Filed Jan. 14, 1952
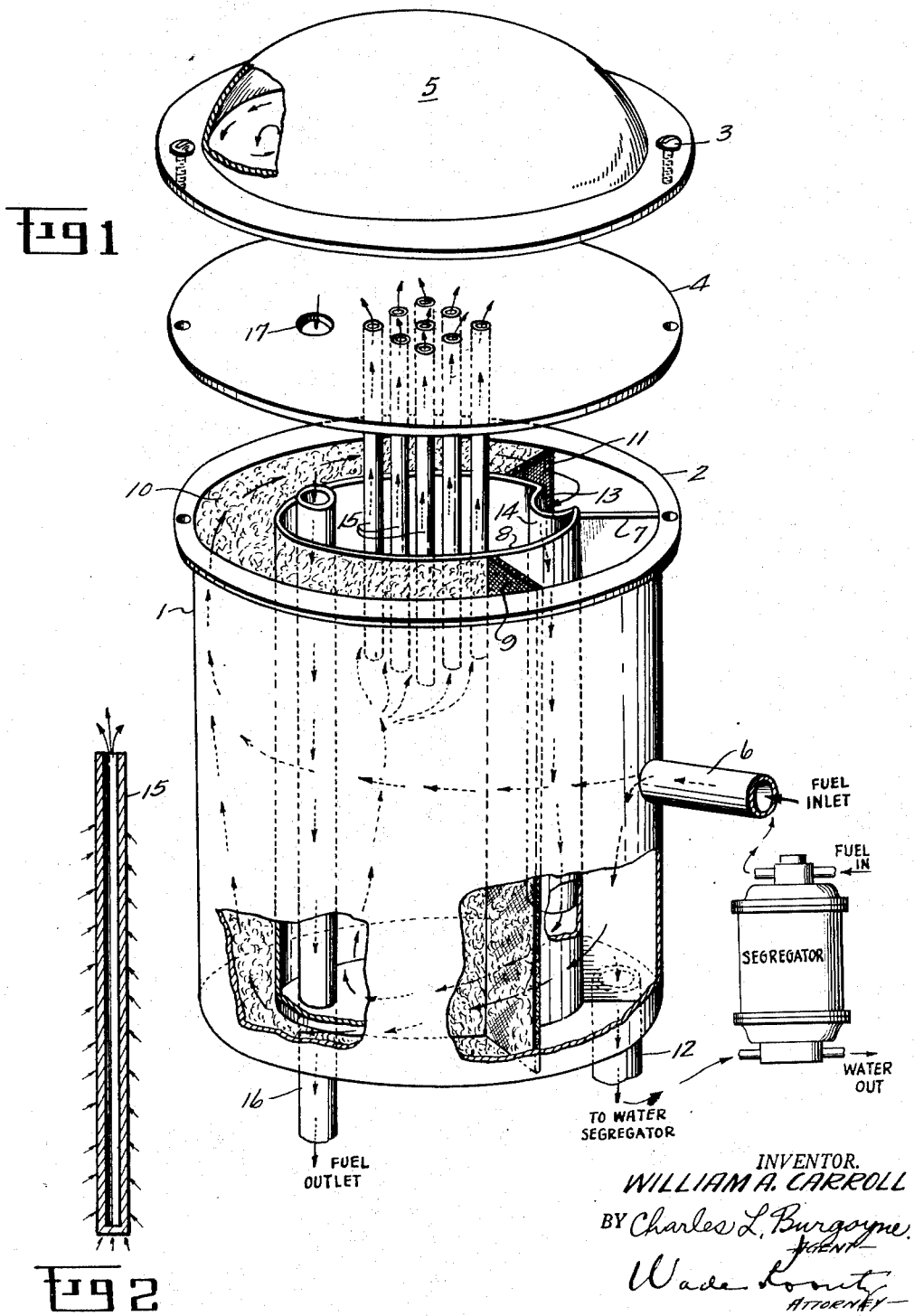
INVENTOR.
WILLIAM A. CARROLL
BY Charles L. Burgoyne
AGENT
Wade Komitz
ATTORNEY Patented May 12, 1953

2,638,221

UNITED STATES PATENT OFFICE 2,638,221

FUEL FILTER AND DEMULSIFIER

William A. Carroll, Berkley, Mich.

Application January 14, 1952, Serial No. 266,435

6 Claims. (Cl. 210—43)

(Granted under Title 35, U. S. Code (1952), sec. 266)

The invention described herein may be manufactured and used by or for the United States Government for governmental purposes without payment to me of any royalty thereon.

The present invention relates to a fuel filter and demulsifier particularly for use in preparing liquid hydrocarbons before they are stored or pumped into the fuel tanks associated with varicus kinds of engines.

The primary object of the invention is to provide a fuel or oil filter and demulsifier of compact form and in which the demulsifying and filtering stages are arranged concentrically with flow of the liquid proceeding systemtically around the outer or demulsifying stage before entering the inner or filtering stage.

A further object of the invention is to provide a fuel or oil filter and demulsifier in which the demulsifying and filtering stages are arranged concentrically within an outer casing, wherein an inner casing is spaced from the outer casing to provide an annular space made discontinuous by means of a radial wall, wherein fuel or oil flow proceeds through the annular space from one side of the radial wall to the other during which time the liquid must pass through a fibrous demulsifying material to cause water to separate from the liquid in droplet form and collect at the bottom of the annular space, wherein the water-free liquid passes through a notch in the inner casing at the upper edge thereof for subsequent filtering through hollow filter elements extending down inside the inner casing, and wherein the upper open ends of the filter elements communicate with a hollow dome on the filter assembly for eventual flow out of the filter by way of an outlet tube extending into the hollow dome.

Another object of the invention is to provide a fuel and oil filter and demulsifier having concentric demulsifying and filtering stages covered by a common cap which is removable to permit access to both stages for servicing the assembly.

The above and other objects of the invention will become apparent upon reading the following detailed description in conjunction with the accompanying drawing, in which:

Fig. 1 is an exploded perspective view of the fuel filter with portions of the casing cut away to show the interior construction and including a segregator shown diagrammatically.

Fig. 2 is a longitudinal cross sectional view taken through one of the porous filtering tubes used in the assembly shown in Fig. 1.

As is well-known most liquid hydrocarbons, such as gasoline and kerosene, usually contain small quantities of water which collect in tanks and pipes by reason of condensation from the atmosphere as well as from rain getting in through filler caps and other fittings. Removal of water and removal of dirt particles is desirable before the fuel or other hydrocarbon oil is used. Thus the present filter to be described below embodies means arranged in a novel and compact way to separate water particles as well as other various foreign matter from motor fuel and liquid hydrocarbons.

Referring to Fig. 1 the filter will be seen to include a drum-like casing or housing 1 sized in proportion to the desired flow rate through the filter. A circular flange 2 at the top of the casing serves to carry bolts 3 for connecting a separator plate 4 and a dome or cover 5 on top of the casing in superimposed relation. Suitable gaskets may be used to secure fluid-tight joints at the confronting surfaces of these adjacent parts, although this expedient is not illustrated. A fuel inlet pipe 6 extends into the casing 1 between the top and bottom ends and at one side of a radial baffle wall 7 extending from the casing 1 to an inner concentric cylinder 8. Thus the fuel and entrained moisture is required to flow around the annular demulsifying chamber in a clockwise direction and in so doing the liquid first passes through a first screen 9, thence through a coalescing and demulsifying filler material 10 and finally through a second screen 11 before reaching the other side of baffle wall 7. Various arrows show in general the path of the liquid through the filter. Near the other side of the baffle wall 7 and extending downwardly from the closed bottom of the filter is a water drain tube 12 in which will collect water and also fuel. However the relatively heavy water will always gravitate through the relatively light fuel and by means of a standard water segregator the water may be rejected automatically from time to time as it collects in the tube 12 and segregator connected thereto. Water segregators suitable for this purpose are well-known and several examples will be seen by referring to Patent No. 1,373,720 to D. B. Gish, Patent No. 1,700,811 to David Samiran and Patent No. 1,732,222 to E. F. Cantrall. The coalescing and filler material may be of any well-known type, such as poplar excelsior, wood shavings, fiberglass or various mixtures of these materials. The filler material is carefully packed in place in the outer annular chamber of the filter assembly. The materials mentioned have a differential or selective action on oil and water, so as to break down oil-water emulsions and cause the water to coalesce in the form of droplets which will readily gravitate toward the bottom of the annular demulsifying and coalescing chamber to combine with other drops before finally reaching the segregating drain 12 and stratifying below the fuel or oil. The filler materials may in some cases be treated with water repelling compounds to promote their coalescing action with respect to water and also to make the filler material effective over a longer period of service.

The water-free oil or fuel leaves the annular demulsifying chamber by way of a notch 13 at the top of the central cylinder or filter casing 8. The notch of generally semi-circular form opens into a tube 14 which stops short of the bottom wall and which opens into the central filter casing. Fixed on the separator plate 4 are porous filter tubes 15 (see Fig. 2) through which the oil or fuel will pass and thereby be cleaned of dirt and foreign particles. The tubes 15 may be of pressed fibers, ceramic materials of various types or even woven textile fabrics formed in tubular shape by wrapping on a mandrel and retained in such shape by a perforated metal sleeve. As will be noted in Fig. 2 the bottom end of the filter tubes is closed but the upper end is open. Thus the filtered oil is free to pass into the space within the dome or cover 5, from whence it flows down an outlet tube 16 which extends through a hole 17 in separator plate 4. The tube 16 extends down through the filter chamber and through the bottom wall of the filter. The use of this form of outlet tube eliminates plumbing directly on the dome 5 and thus facilitates opening the filter for the purpose of cleaning and replacing parts thereof. It will be understood that the use of tubular filtering elements is just one example of possible filtering means. Other kinds of filtering devices having large areas exposed to the filterable liquid are well-known. Several types are disclosed in "Diesel Engineering Handbook" by L. H. Morrison published by Diesel Publications, Inc. of New York city.

The structural arrangement of parts in the present filter and demulsifier results in a compact unit requiring less material for construction and using less floor space than other two-stage demulsifying filters. For instance in one example already tested the unit has a capacity for handling 300 gallons per minute of aviation fuel and yet the depth is only 30 inches, the outer casing is only 34 inches in diameter and the inner cylinder is only 18 inches in diameter. The structural arrangement also facilitates servicing of the unit because of the fact that no pipes attach to the removable dome and also because both stages of the demulsifying filter may be serviced immediately upon removal of the dome 5 and separator plate 4. The present filter and demulsifier is relatively simple to build, highly efficient and being made with a saving of material over earlier devices of a similar nature is also lighter in weight.

The embodiments of the invention herein shown and described are to be regarded as illustrative only and it is to be understood that the invention is susceptible of variations, modifications and changes within the scope of the appended claims.

I claim:

1. A fuel filter and demulsifier comprising, an outer demulsifying chamber, an inner filtering chamber within said outer chamber and separated therefrom by an impervious wall forming an inner casing, means in said outer chamber to cause coalescence of water particles mixed with said fuel, means to cause fuel entering said outer chamber to flow in an orderly manner therethrough, means to conduct water-free fuel from said outer chamber into said inner chamber, and porous means within said inner casing to filter the water-free fuel and separate foreign particles therefrom.

2. A fuel filter and demulsifier comprising, an outer casing having a closed bottom wall and a closed top wall, an inner casing within the outer casing and spaced therefrom to provide a demulsifying chamber between the side walls of the two casings, fibrous demulsifying material in said demulsifying chamber, a fuel inlet through said outer casing into said demulsifying chamber, means in said demulsifying chamber to cause orderly circulation of fuel through said demulsifying material, an outlet at the bottom of said demulsifying chamber to carry off water which coalesces by action of said demulsifying material, means to conduct water-free fuel from said demulsifying chamber into said inner casing, and porous means within said inner casing to filter the water-free fuel and separate foreign particles therefrom.

3. A fuel filter and demulsifier comprising, a cylindrical outer casing having a closed bottom wall and a closed top wall, a cylindrical inner casing within the outer casing and spaced therefrom to provide a demulsifying chamber between the side walls of the two casings, a baffle wall extending between the side walls of the two casings and from said bottom wall to said top wall, a fuel inlet through said outer casing near one side of said baffle wall, fibrous demulsifying material in said demulsifying chamber, an outlet at the bottom of said demulsifying chamber near the other side of said baffle wall to carry off water which coalesces from said fuel by action of said demulsifying material, means to conduct water-free fuel from said demulsifying chamber into said inner casing, and means within said inner casing to filter the water-free fuel and separate foreign particles therefrom.

4. A fuel filter and demulsifier comprising, an outer casing having a closed bottom wall and a closed top wall, an inner casing within the outer casing and spaced therefrom to provide a demulsifying chamber between the side walls of the two casings, a baffle wall extending between the side walls of the two casings and from said bottom wall to said top wall, a fuel inlet through said outer casing near one side of said baffle wall, fibrous filler material packed in said demulsifying chamber and adapted to cause progressive coalescing of water particles mixed with said fuel, an outlet at the bottom of said demulsifying chamber near the other side of said baffle wall to carry coalesced water and minor quantities of fuel into an adjacent water segregator, means providing an opening in said inner casing adjacent to the top end thereof to allow passage of water-free fuel into said inner casing from said demulsifying chamber, a hollow porous filtering element having continuous porous walls exposed to fuel in said inner casing and having one open end portion extending from said inner casing, and means providing a fuel outlet in direct communication with said open end portion of said filtering element.

5. A fuel filter and demulsifier comprising, a cylindrical outer casing having a closed bottom wall and a closed top wall, a cylindrical inner casing within the outer casing and spaced therefrom to provide a demulsifying chamber between the side walls of the two casings, a baffle wall extending between the side walls of the two casings and from said bottom wall to said top wall, a fuel inlet through said outer casing near one side of said baffle wall, fibrous demulsifying material in said demulsifying chamber, an outlet at the bottom of said demulsifying chamber near the other side of said baffle wall to carry coalesced water and minor quantities of fuel into an adjacent water segregator, means providing an opening in said inner casing adjacent to the top end thereof to allow passage of water-free fuel into said inner casing from said demulsifying chamber, a filtering element having porosity to the water-free fuel and extending into said inner casing from said top wall, and means to conduct filtered fuel from the interior of said filtering element to a fuel outlet extending through said bottom wall.

6. A fuel filter and demulsifier comprising, an outer casing having a closed bottom wall and a closed removable top wall, an inner casing within the outer casing and spaced therefrom to provide a demulsifying chamber between the side walls of the two casings, a fuel inlet through said outer casing into said demulsifying chamber, means to drain coalesced water and minor quantities of fuel from the lower end of said demulsifying chamber, means to conduct water-free fuel from said demulsifying chamber into said inner casing, filtering means attached to said removable top wall to extend into said inner casing and having an outlet for filtered fuel extending upwardly through said top wall, a hollow domed cap removably secured over said top wall, and conduit means extending downwardly through said top wall, through the space bounded by said inner casing and through said bottom wall to carry filtered fuel out of the hollow domed cap and out of the fuel filter and demulsifier.

WILLIAM A. CARROLL.

References Cited in the file of this patent
UNITED STATES PATENTS

| Number | Name | Date |
|---|---|---|
| 1,591,852 | MacArthur | July 6, 1926 |
| 1,787,577 | Hills | Jan. 6, 1931 |
| 2,405,838 | Lawson et al. | Aug. 13, 1946 |
| 2,523,793 | Vance | Sept. 26, 1950 |
| 2,555,607 | Robinson | June 5, 1951 |